US012594495B2

(12) United States Patent
Cook et al.

(10) Patent No.: US 12,594,495 B2
(45) Date of Patent: Apr. 7, 2026

(54) COMPUTER SYSTEM AND COMPUTER IMPLEMENTED METHOD FOR GAMING IN A VIRTUALISATION ENVIRONMENT

(71) Applicant: Radian Arc Limited, Subiaco (AU)

(72) Inventors: David Cook, Subiaco (AU); Ed Seibold, Subiaco (AU)

( * ) Notice: Subject to any disclaimer, the term of this patent is extended or adjusted under 35 U.S.C. 154(b) by 174 days.

(21) Appl. No.: 18/685,685

(22) PCT Filed: Aug. 4, 2022

(86) PCT No.: PCT/AU2022/050839
§ 371 (c)(1),
(2) Date: Feb. 22, 2024

(87) PCT Pub. No.: WO2023/023696
PCT Pub. Date: Mar. 2, 2023

(65) Prior Publication Data
US 2024/0342594 A1      Oct. 17, 2024

(30) Foreign Application Priority Data

Aug. 24, 2021    (AU) ................................. 2021902670

(51) Int. Cl.
*A63F 13/352*          (2014.01)
*A63F 13/355*          (2014.01)
(Continued)

(52) U.S. Cl.
CPC .......... *A63F 13/352* (2014.09); *A63F 13/355* (2014.09); *A63F 13/358* (2014.09);
(Continued)

(58) Field of Classification Search
CPC .... A63F 13/352; A63F 13/355; A63F 13/358; A63F 13/77; G06F 9/45558;
(Continued)

(56) References Cited

U.S. PATENT DOCUMENTS

2012/0218278 A1 *  8/2012  Marketsmueller ........ G06F 9/38
                                                         345/522
2015/0105148 A1     4/2015  Consul et al.
(Continued)

FOREIGN PATENT DOCUMENTS

KR        20150085376  A      7/2015
KR        20190074165  A      7/2019
(Continued)

OTHER PUBLICATIONS

Korean Patent Office , "International Search Report", Application No. PCT/AU2022/050839;, Nov. 3, 2022, 3 pages.

*Primary Examiner* — Pegeman Karimi
(74) *Attorney, Agent, or Firm* — Blanchard Horton PLLC

(57) ABSTRACT
The present invention relates to a computer-implemented method of gaming in a virtualisation environment. The method comprises obtaining information in relation to a plurality of games, the information including technical information indicative of the required GPU resource of each game, providing a GPU server comprising at least one graphics processing unit (GPU) with a predefined GPU capacity, receiving from a computing device a gaming request, and dynamically creating a virtual machine on the GPU server, the virtual machine being assigned a virtual GPU capacity from the at least one GPU that substantially matches the required GPU resource for the game.

20 Claims, 7 Drawing Sheets

(51) Int. Cl.
    *A63F 13/358*     (2014.01)
    *A63F 13/77*     (2014.01)
    *G06F 9/455*     (2018.01)

(52) U.S. Cl.
    CPC .......... *A63F 13/77* (2014.09); *G06F 9/45558*
            (2013.01); *G06F 2009/45595* (2013.01)

(58) Field of Classification Search
    CPC ....... G06F 2009/45595; G06F 9/45533; G06F
            9/455; G06Q 30/0202; G06Q 99/00
    See application file for complete search history.

(56)               References Cited

U.S. PATENT DOCUMENTS

2016/0354690 A1*  12/2016  Gault ...................... A63F 13/45
2017/0065896 A1*   3/2017  Nevins ................. A63F 13/828

FOREIGN PATENT DOCUMENTS

KR      20190076212 A    7/2019
WO     2023023696 A1   3/2023

* cited by examiner

700

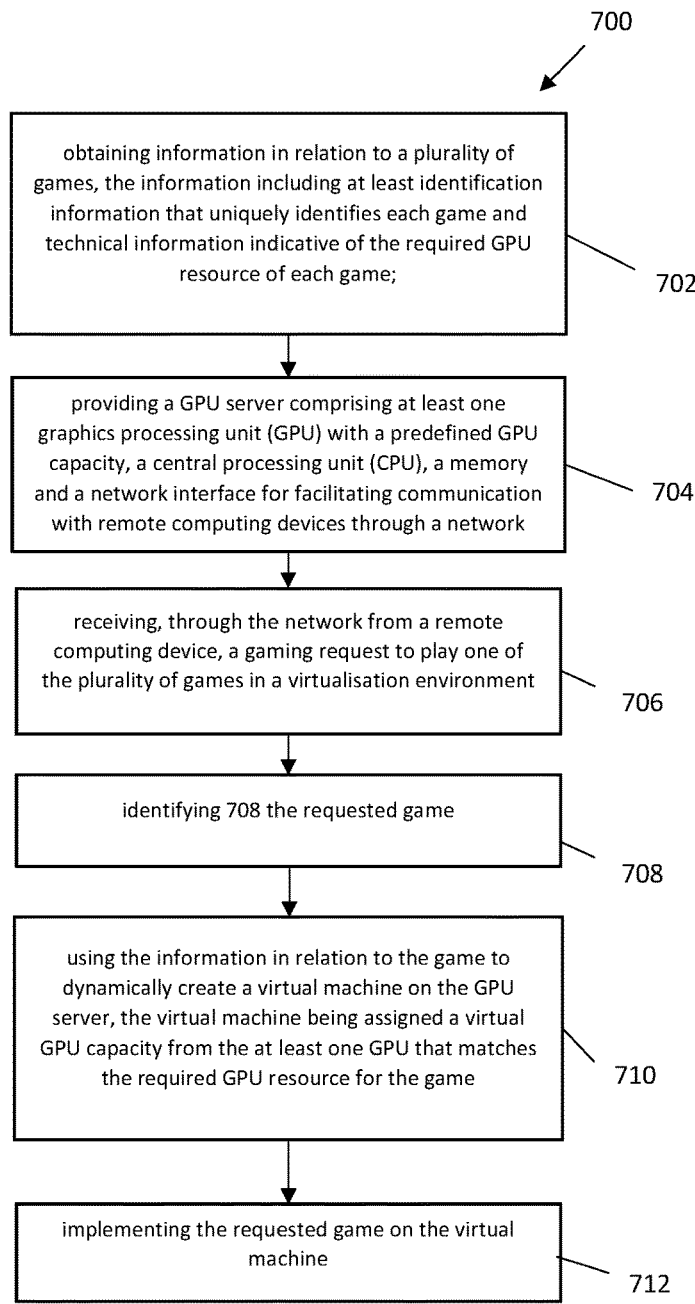

obtaining information in relation to a plurality of games, the information including at least identification information that uniquely identifies each game and technical information indicative of the required GPU resource of each game;

702 providing a GPU server comprising at least one graphics processing unit (GPU) with a predefined GPU capacity, a central processing unit (CPU), a memory and a network interface for facilitating communication with remote computing devices through a network

704 receiving, through the network from a remote computing device, a gaming request to play one of the plurality of games in a virtualisation environment

706 identifying 708 the requested game

708 using the information in relation to the game to dynamically create a virtual machine on the GPU server, the virtual machine being assigned a virtual GPU capacity from the at least one GPU that matches the required GPU resource for the game

710 implementing the requested game on the virtual machine

COMPUTER SYSTEM AND COMPUTER IMPLEMENTED METHOD FOR GAMING IN A VIRTUALISATION ENVIRONMENT

This application is a 371 Nationalization of International Application No. PCT/AU2022/050839, filed Aug. 4, 2022, which claimed the benefit of Australian application number 2012902670, filed Aug. 24, 2021, the contents of which are incorporated herein by reference in their entirety, except that in the event of any inconsistent disclosure or definition from the present application, the disclosure or definition herein shall prevail.

TECHNICAL FIELD

The present invention relates to a computer system, a computer implemented method and a software application for gaming in a virtualisation environment.

BACKGROUND

In computer systems, graphics processing units (GPUs) can supplement the central processing unit (CPU) by providing a specialised electronic circuit that can perform mathematical operations rapidly. A GPU is generally designed to rapidly manipulate and alter memory to accelerate parallel computing tasks and the processing of visual media, such as the creation of images in a frame buffer intended for output to a display device.

GPU virtualisation is a relatively new concept that allows the use of a GPU to accelerate graphics or GPU applications running on a virtual machine.

Any discussion of documents, acts, materials, devices, articles or the like which have been included in the present specification is not to be taken as an admission that any or all of these matters form part of the prior art base or were common general knowledge in the field relevant to the present invention as it existed before the priority date of each claim of this application.

It will also be appreciated that the terms "comprise", "comprising", "include", "including", "contain", "containing", "have", "having", and any variations thereof, used in this document are intended to be understood in an inclusive (i.e. non-exclusive) sense, such that the process, method, device, apparatus, or system described herein is not limited to those features, integers, parts, elements, or steps recited but may include other features, integers, parts, elements, or steps not expressly listed and/or inherent to such process, method, process, method, device, apparatus, or system. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects. In addition, reference to positional terms, such as "lower" and "upper", used in the above description are to be taken in context of the embodiments depicted in the figures, and are not to be taken as limiting the invention to the literal interpretation of the term but rather as would be understood by the skilled addressee in the appropriate context.

SUMMARY

Embodiments of the present invention relate to a computer-implemented method of gaming in a virtualisation environment, the method comprising:

obtaining information in relation to a plurality of games, the information including at least identification information that uniquely identifies each game and technical information indicative of the required GPU resource of each game;

providing a GPU server comprising at least one graphics processing unit (GPU) with a predefined GPU capacity, a central processing unit (CPU), a memory and a network interface for facilitating communication with computing devices through a network;

receiving, through the network, from a computing device a gaming request to play one of the plurality of games in a virtualisation environment;

identifying the requested game and using the information in relation to the identified game to dynamically create a virtual machine on the GPU server, the virtual machine being assigned a virtual GPU capacity from the at least one GPU that substantially matches the required GPU resource for the game; and implementing the requested game on the virtual machine.

In some embodiments, the method may comprise receiving, through the network, a plurality of gaming requests from a plurality of respective computing devices. In such case, the method may be conducted such that a plurality of virtual machines are dynamically created on the GPU server, wherein each virtual machine is assigned a virtual GPU capacity from the at least one GPU that matches the required GPU resource for the respective game. The computing devices may be any suitable communications-enabled computing devices, including but not limited to computer servers, client computing devices, such as gaming consoles, smartphones, tablets, desktop computers, laptop computers, and gaming provider platforms, such as game publisher platforms and gaming as a service (GaaS) platforms.

Embodiments of the present invention provide significant advantages. In particular, by creating one or more virtual machines and setting the virtual GPU resource to substantially match a game request, it is possible that more than one game can be played using a single GPU. In this way, utilisation of the GPU server can be optimised. Even more so, at least some embodiments allow for a faster starting time and higher performance while optimising the availability of GPU resources.

Furthermore, embodiments of the present invention have the advantage that games that require a minimum of GPU resources may be played on computing devices that do not themselves comprise a GPU and/or the required GPU resources.

In an embodiment, the identification information in relation to the game may include but is not limited to one or more of the following: a unique identifier which may or may not be system generated, a title of the game, a genre, a recommended age group, usage data, category, demand score or the like.

In an embodiment, the technical information in relation to the game may include but is not limited to one or more of the following: information indicative of optimal video resolution, minimum frames per second, memory utilisation, CPU utilisation, network availability, and supported client computing devices.

In an embodiment, at least some of the information in relation to a game is obtained through the gaming request. This may be realised through an application programming interface (API) that communicates with the remote computing devices.

In an embodiment, the step of dynamically creating one or more virtual machines comprises the step of dynamically dividing the GPU capacity of a GPU on the GPU server into one or more units of virtual GPUs. For example, one physical GPU on the GPU server may be divided into one or more pre-defined virtual units of GPU, such as 1 vGPU, 2 vGPU, 4 vGPU, 8 vGPU, or in general n-vGPUs.

In an embodiment, the method may comprise determining a capacity of available GPU resources on the GPU server for additional game requests in the virtualisation environment. Specifically, the method may comprise determining a substantially real-time capacity of available GPU resources.

In a further embodiment, the method may comprise determining a latency for the GPU server.

If a plurality of GPUs are provided on the GPU server, for example, by virtue of a plurality of graphic cards, the method may use the information on the determined capacity of available GPU resources and the information in relation to a game associated with a game request to select one of the plurality of GPUs to create the virtual machine on the selected GPU.

Further, the method may comprise a step of using the information on the determined capacity of available GPU resources and the information in relation to a game associated with a game request to re-format the game to be implemented on a virtual machine. For example, the method may comprise re-formatting the game to be implemented with a lower video resolution.

In an embodiment, the method may comprise obtaining information in relation to the game request, including but not limited to a client device IP, location information of the client device, a publisher of the game, a service provider (such as Telcos), information in relation to gaming as a service (GaaS), a location information of a computing device where the gaming request is received.

In an embodiment, the method may comprise obtaining additional information in relation to the game. The additional information may relate to third party data that matches an identified game and may include but is not limited to one or more of the following:

historical and/or current usage data, such as demographic usage data, location usage data, average length of play, average time of play;

popularity information;

rating;

information derived from marketing campaigns (such as location information, reach, frequency, total impressions, dates, conversion rates, cost per acquisition, campaign ROI);

information derived from social media; and information derived from esports publishing platforms.

In an embodiment, the method may comprise a step of using the obtained additional information to determine a popularity in relation to the plurality of games. For example, the method may determine a popularity ranking of the plurality of games and/or a popularity rating of each games.

In a further step, the method may comprise a step of using the identification information and/or the additional information to characterise a game in a plurality of categories. Games relating to one category may be similar to one each other in relation to genre, supported device type, connectivity and/or other properties relating to the game.

The popularity and/or demand score may be determined by location, such as by city, region, state or country. This embodiment provides the significant advantage that the determined information provides publishers of games with valuable information as to where to release and promote a game.

In an embodiment, the method may comprise providing a plurality of computer servers that are connected to each other and the GPU server via the network, wherein each computer server is associated with GPU capacity (if any), CPU and storage information. In addition, each computer server may be associated with one or more of the following: location information indicative of the location of the computer server, connectivity data such as latency data to reach the computer server, public cloud availability and capacity.

In an embodiment, each computer server is configured as a point of present (POP) within the network.

The method may comprise a step of determining a latency for each computer server and GPU server. The method may include a step of using the determined latency to route a gaming request to a selected computer server. For example, if the determined latency for a selected GPU server exceeds a predetermined threshold, the method may select another GPU server, computer server or public cloud server to send the gaming request to.

Each computer server, including the GPU server, may comprise a memory for storing games. The method may comprise a step of selectively storing the plurality of games on one or more of the plurality of computer servers. The method may use the additional information in relation to the plurality of games, such as popularity, to select a computer server and/or GPU server. For example, the plurality of game may be selectively stored depending on the popularity of each game at a specific location. Specifically, games that are most popular at a specific location may be stored on the GPU server at that location, whereas games that are less popular at the specific location, may be stored on a computer server without GPU capacity at the location or remotely. This embodiment has the particular advantage that the starting time for the most popular games is the shortest as these are stored on the memory of the GPU server.

In an embodiment, the step of creating a virtual machine and implementing the game on the virtual machine may be conducted in accordance with a set of rules. For example, if it is determined that the capacity of available GPU resources at the GPU server falls below a predefined threshold, the method may include a step of facilitating to implement the game on a further computer server. Additionally or alternatively, if it is determined that the capacity of available GPU resources at the GPU server falls below a predefined threshold, the method may comprise a step of reformatting a game associated with a gaming request to be implemented with a lower GPU resource, such as a lower video resolution.

In an embodiment, the information obtained in relation to the game and/or game requests is collected and processed at a dedicated database management platform.

In an embodiment, information obtained in relation to the plurality of games and game requests may be used to generate information indicative of a demand of GPU resources. For example, the information may indicate that a demand of available GPU resources will increase at a specific location, for example, due to an upcoming game release. The generated information may be used to implement additional resources, such as additional computer servers and/or GPU servers.

Embodiments of the present invention relate to a computer system for gaming in a virtualisation environment, the computer system comprising:

at least one graphics processing unit (GPU) with a predefined GPU capacity;

a central processing unit (CPU);

a network interface for communicating with computing devices via a network;

a virtualisation service to establish a virtualisation environment comprising a plurality of virtual machines, each virtual machine comprising a graphics driver to communicate with the at least one GPU;

a memory having a plurality of instructions stored therein that, when executed by the CPU, causes the computer system to:

obtaining information in relation to a plurality of games, the information including at least identification information that uniquely identifies each game and technical information indicative of the required GPU resource of each game;

receiving, through the network from a remote computing device, a gaming request to play one of the plurality of games in a virtualisation environment;

identifying the requested game and using the information in relation to the game to dynamically create a virtual machine, the virtual machine being assigned a virtual GPU capacity from the at least one GPU that matches the required GPU resource for the game; and implementing the requested game on the virtual machine.

In an embodiment, the computer system may further comprise a data management platform (DMP) that is configured to obtain and process the information in relation to the plurality of games. A person skilled in the art will appreciate that the DMP may or may not be part of the GPU server. For example, the DMP may be located remote relative to the GPU server.

In an embodiment, the computer system may comprise a plurality of computer servers that are communicatively connected to each other through one or more networks.

Further embodiments of the present invention relate to a computer-implemented method of gaming in a virtualisation environment, the method comprising:

obtaining information in relation to a plurality of games, the information including at least:

identification information that uniquely identifies each game;

technical information indicative of the required GPU resource of each game;

usage data indicating historical and/or present usage of each game in a virtualisation environment;

providing a plurality of GPU servers, each GPU server comprising at least one graphics processing unit (GPU) with a predefined GPU capacity, a central processing unit (CPU), a memory and a network interface for facilitating communication with computing devices through a network;

receiving, through the network from a computing device, a plurality of gaming requests, each gaming request being to play one of the plurality of games in a virtualisation environment, and comprising at least identification information uniquely identifying the requested game and location information relating to the request; and using the obtained information in relation to the plurality of games and the location information to determine a GPU resource requirement relative to the predefined GPU capacity for an identified location.

In an embodiment, the location may be a city, a region, a cell tower connection, a state or a country.

In an embodiment, the GPU resource requirement relative to the predefined GPU capacity is determined to analyse a utilisation of the GPUs of the plurality of GPU servers, for example, by location. Analysing the utilisation of the existing GPUs may provide valuable information as to the planning, implementation and maintaining of GPU servers.

Additionally or alternatively, the GPU resource requirement relative to the predefined GPU capacity is determined to analyse a future demand of GPU resources for an identified location. This embodiment has the particular advantage that the strategic acquisition and implementation of additional GPU resources can be optimised.

In an embodiment, the method may comprise obtaining additional information in relation to the game. The additional information may relate to third party data that matches an identified game and may include but is not limited to one or more of the following:

popularity information;

rating;

information derived from marketing campaigns (such as location information, reach, frequency, total impressions, dates, conversion rates, cost per acquisition, campaign ROI);

information derived from social media; and information derived from esports publishing platforms.

In an embodiment, the method may comprise a step of using the obtained additional information to determine a popularity in relation to the plurality of games. For example, the method may determine a popularity ranking of the plurality of games and/or a popularity rating of each games.

In a further step, the method may comprise a step of using the identification information and/or the additional information to characterise a game in a plurality of categories and using the characterisation to determine a demand score. Games relating to one category may be similar to one each other in relation to genre, supported device type, connectivity and/or other properties relating to the game. Determining a demand score may assist in predicting a number of gaming requests for a game.

The popularity and/or demand score may be determined for a specific location, such as for a city, region, state or country. This embodiment provides the significant advantage that the determined information provides publishers of games with valuable information as to where to release and promote a game.

Embodiments of the present invention relate to a computer system for gaming in a virtualisation environment, the computer system comprising:

at least one graphics processing unit (GPU) with a predefined GPU capacity;

a central processing unit (CPU);

a network interface for communicating with computing devices via a network;

a virtualisation service to establish a virtualisation environment comprising a plurality of virtual machines, each virtual machine comprising a graphics driver to communicate with the at least one GPU;

a memory having a plurality of instructions stored therein that, when executed by the CPU, causes the computer system to:

obtaining information in relation to a plurality of games, the information including at least identification information that uniquely identifies each game;

technical information indicative of the required GPU resource of each game;

usage data indicating historical and/or present usage of each game;

receiving, through the network from a computing device, a plurality of gaming requests, each gaming request being to play one of the plurality of games in a virtualisation environment, and comprising at least identification information uniquely identifying the requested game and location information relating to the request;

using the obtained information in relation to the plurality of games and the location information to determine a GPU resource requirement relative to the predefined GPU capacity for an identified location.

The invention will be more fully understood from the following description of specific embodiments of the invention. The description is provided with reference to the accompanying drawings.

BRIEF DESCRIPTION OF DRAWINGS

FIG. 7 shows a flow chart illustrating a computer implemented method of gaming in a virtualisation environment in accordance with an embodiment of the present invention.

DESCRIPTION OF EMBODIMENTS

Figure 1:
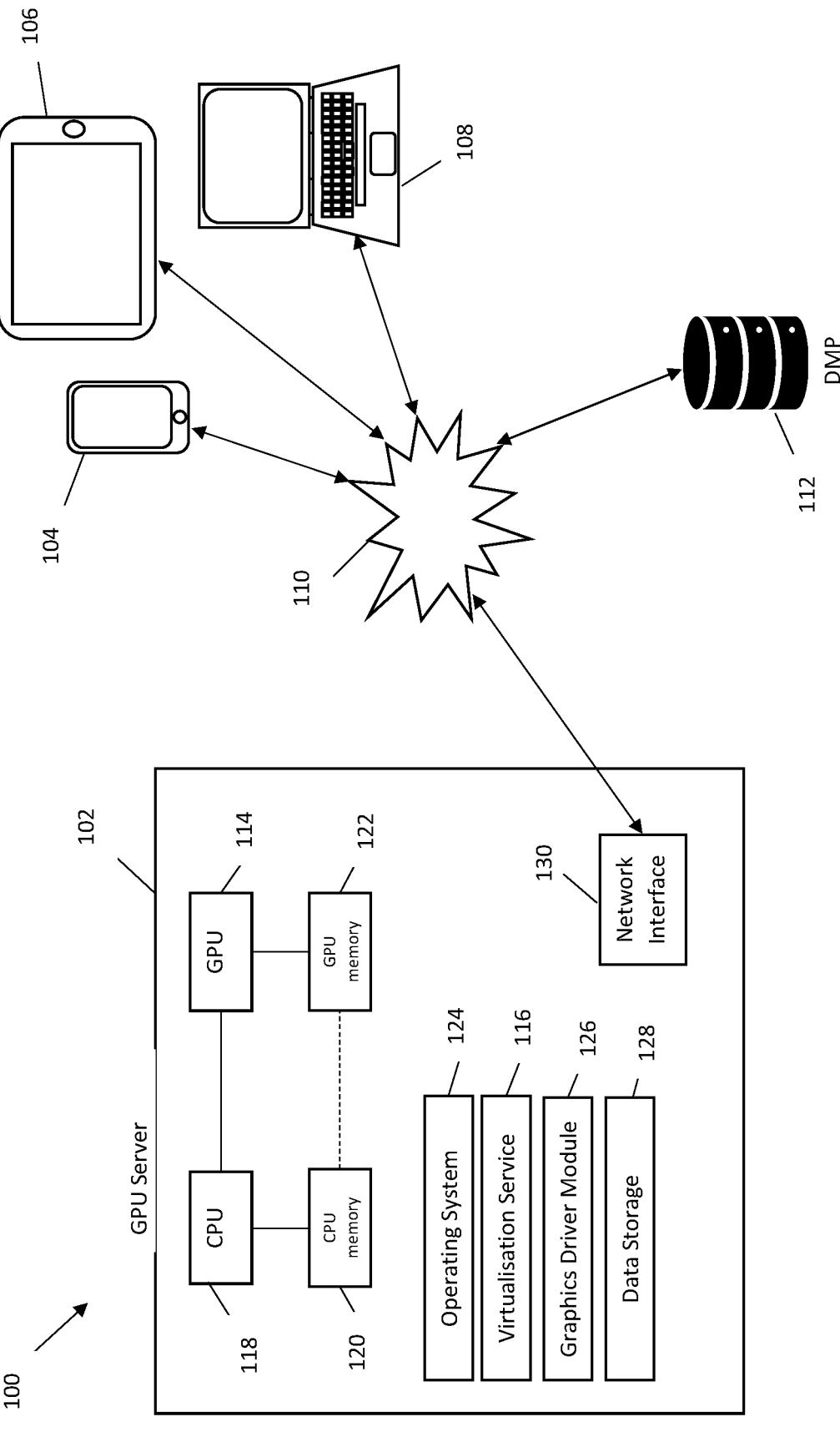
FIG. 1 is a schematic representation of a computer system for gaming in a virtualisation environment in accordance with an embodiment of the present invention.

Embodiments of the present invention generally relate to a computer system, and a computer-implemented method for gaming in a virtualisation environment. With regard to a first aspect relating to the computer-implemented method, the method may comprise an initial step of providing one or more GPU servers that include at least one graphics processing unit (GPU) with a predefined GPU capacity, a central processing unit (CPU), a memory and a network interface for facilitating communication with computing devices through a network, such as the Internet. The computing devices may be any suitable communications-enabled computing devices, including but not limited to computer servers, game provider platforms and client computing devices, including but not limited to gaming consoles, smartphones, tablets, desktop computers and laptop computers.

The at least one GPU may, for example, be realised by a graphics card with a specific GPU capacity. The method further comprises the step of obtaining information in relation to a plurality of games. The information includes at least identification information that uniquely identifies each game and technical information indicative of the required GPU resource of each game. The method further comprises a step of receiving, through the network, from a computing device, a gaming request to play one of the plurality of games in a virtualisation environment. The technical information of the game may, for example, include the required and/or optimal video resolution and frames per seconds.

A person skilled in the art will appreciate that these steps may or may not be performed by the GPU server itself. For example, the GPU server may be part of a network of a plurality of computer servers. The gaming request may be received at a first computer server, the information in relation to the plurality of games may be stored at a second computer server, for example, one that comprises a specifically dedicated data management platform (DMP) and the requested game may be implemented at a third computer server, in this case a GPU server.

The computer implemented method then comprises a step of identifying the requested game specified in the gaming request and uses the information in relation to the game to dynamically create a virtual machine on the GPU server. The virtual machine is assigned a virtual GPU capacity from the at least one GPU that substantially matches the required and/or optimal GPU resource for the game. The entire GPU capacity of the GPU may be assigned to the created virtual machine. This is in particular true if the game has relatively high gaming specifications, such as a video resolution of 4 k. Alternatively, the virtual GPU capacity may be less than the GPU capacity of the GPU. In this case, the GPU capacity of the physical GPU is dynamically divided into multiple virtual machines with smaller virtual GPUs that substantially match the technical specifications of the game. In this way, one GPU may be utilised by more than one game depending on the technical specifications of the games. Once the virtual machine is created, the game is implemented on that virtual machine.

Embodiments of the present invention provide significant advantages. For example, by creating multiple virtual machines and assigning the virtual GPU resource to match the technical specifications of a game request, multiple games can be played using a single GPU on the GPU server. In this way, utilisation of the GPU server can be optimised. More advantages of embodiments of the present invention will become apparent in the following where specific embodiments of the present invention will be exemplarily described.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic components. A programmatic component may include a program, a subroutine, a portion of a program, or a software component or a hardware component capable of performing one or more stated tasks or functions. As used herein, a component can exist on a hardware component independently of other components. Alternatively, a component can be a shared element or process of other modules, programs or machines.

Furthermore, one or more embodiments described herein may be implemented through the use of instructions that are executable by one or more processors. These instructions may be carried on a computer readable medium. Systems and devices shown or described below provide examples of processing resources and computer-readable mediums on which instructions for implementing embodiments of the invention can be carried and/or executed. In particular, the systems and devices shown in embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilise processors, memory, and instructions stored on computer-readable and listenable mediums. Additionally, embodiments may be implemented in the form of computer-programs, or a computer usable carrier medium capable of carrying such a program.

System Overview

Referring initially to FIG. 1 of the accompanying drawings, there is shown a computer system 100 for gaming in a virtualisation environment in accordance with one exemplary embodiment of the present invention. The computer system 100 comprises a GPU server 102 which is in communication with a plurality of client computing devices 104, 106, 108 through one or more communications networks 110. The communications network 110 represents communication pathways between the GPU server 102, the client computing devices 104, 106, 108 and other communications enabled computing devices, including but not limited to other computer servers, such as a database management platform (DMP) 112 or other points of presences (PoPs) as will be described in a particular example below. In this embodiment, the communications network 110 is the Internet. However, a person skilled in the art will appreciate that other networks may be utilised, such as dedicated or private communications links (e.g. WAN, MAN or LAN) that are not necessarily part of the Internet. The network 110 typically uses standard communications technologies and/or protocols.

In this particular example, the exemplary client computing devices are depicted as a smartphone 104, a tablet computer 106, and a personal computer 108. However, the client computing devices 104, 106, 108 may be any devices that are or incorporate a computer, such as a personal computer (PC), a desktop computer, a laptop computer, a notebook, a gaming console, a wearable computing device or the like. A computer is a device having one or more general or special purpose processors, memory, storage, and networking components (either wired or wireless). Each of the computing devices typically execute an operating system, for example, a Microsoft Windows-compatible operating system (OS), Apple OS X or iOS, a Linux distribution or Google's Android OS. The client computer devices may be associated with consumers of the games. Additionally or alternatively, the client computer devices may be associated with games as a service (GaaS) platforms, game publishers or service providers.

In the present example, the GPU server 102 includes a graphics processing unit (GPU) 114 and a virtualisation service 116 that can provide GPU virtualisation. In the following, "graphics processing unit" or "GPU" may be used herein to refer to, among other things, a graphics processing unit, graphics accelerator, or other type of specialised electronic circuit or device such as a general purpose GPU (GPGPU), a visual processing unit, an accelerated processing unit (APU), a field-programmable gate array (FPGA), or any other device or circuit that can be used by the computer system 100 to accelerate graphics tasks and/or other computing operations that would benefit from accelerated processing.

Furthermore, in the following, a "game" may be used herein to refer to, among other things, a video game, an electronic game, a hybrid/combined game, a console game, a hybrid/combined game or any other game that can be implemented by the computer system 100, including but not limited to games being played in simulated realities, such as virtual reality, augmented reality and mixed reality.

The illustrated virtualisation service is configured to establish a virtualisation environment for the GPU 114 that includes one or more virtual machines (VMs). In this particular example, the virtualisation service 116 is implemented by a hypervisor which is controlled and coordinated by a central processing unit (CPU) 118. However, a person skilled in the art will appreciate that alternatively, the virtualisation service may create one or more containers instead of virtual machines. For the ease of reading, in the following a "virtual machine" may be used herein to refer to a virtual machine as well as a container. Containers differ to virtual machines in that containers typically share the host operating system, whereas virtual machines typically run a unique guest operating system.

The CPU 118 is generally configured to control and coordinate operations, including submitting GPU commands to the GPU 114. This may be implemented by direct memory access between a CPU memory 120 and a GPU memory 122. The CPU 118 may be embodied as a single or multi-core processor(s), digital signal processor, microcontroller, or other processor or processing/controlling circuit. The CPU memory 120 and the GPU memory 122 may each be embodied as any type of volatile or non-volatile memory or data storage capable of performing the functions described herein.

The GPU server 102 in this embodiment further comprises an operating system 124, a graphics driver module 126, a data storage 128 and a network interface 130. It will be appreciated by a person skilled in the art that additional components may be present, such as those commonly found in computer servers, including but not limited to an input/output system, a display and the like. Even more so, one or more of the illustrative components may be incorporated in, or otherwise form a portion of, another component. The components may be embodied as software, firmware, hardware or a combination of software and hardware.

The data storage 128 may be embodied as any type of device or devices configured for short or long term storage of data such as, for example, memory devices and circuits, memory cards, hard disk drives, solid state drives or other data storage devices. In operation, the data storage 128 in accordance with some embodiments of the present invention may store a plurality of games, in particular popular games that are requested frequently.

The network interface 130 facilitates wireless communications between the GPU server 102 and the client computing devices 104, 106, 108 and other computer servers through the Internet 110. Specifically, the GPU server 102 is accessible by the client computing devices 104, 106, 108 through web pages served to the client computing devices 104, 106, 108. This may be realised by software implemented by the CPU 118, and through an application programming interface (API) that communicates with the user computing devices 104, 106, 108 using a dedicated application installed on the user computing devices 104, 106, 108. Additionally or alternatively, the client computing device 104, 106, 108 may use a web browser, such as Microsoft Internet Explorer, Mozilla Firefox, Google Chrome, Apple Safari and/or Opera, as an interface to interact with the GPU server 102.

Referring now in more detail to the virtualisation service 116, the function of which is to implement a virtualisation environment by creating one or more virtual machines (VMs). In this example, the virtualisation service 116 is embodied as a type of hypervisor. It may be realised by a "thin" hypervisor or a more traditional hypervisor, virtual machine manager or similar virtualisation platform. This virtualisation service 116 manages the virtualisation of shared resources of the GPU server 102, in particular the GPU 114. A person skilled in the art will appreciate that using a hypervisor is only one exemplary implementation. As an alternative, the virtualisation service 116 may be embodied by creating one or more containers instead of virtual machines.

Figure 2:
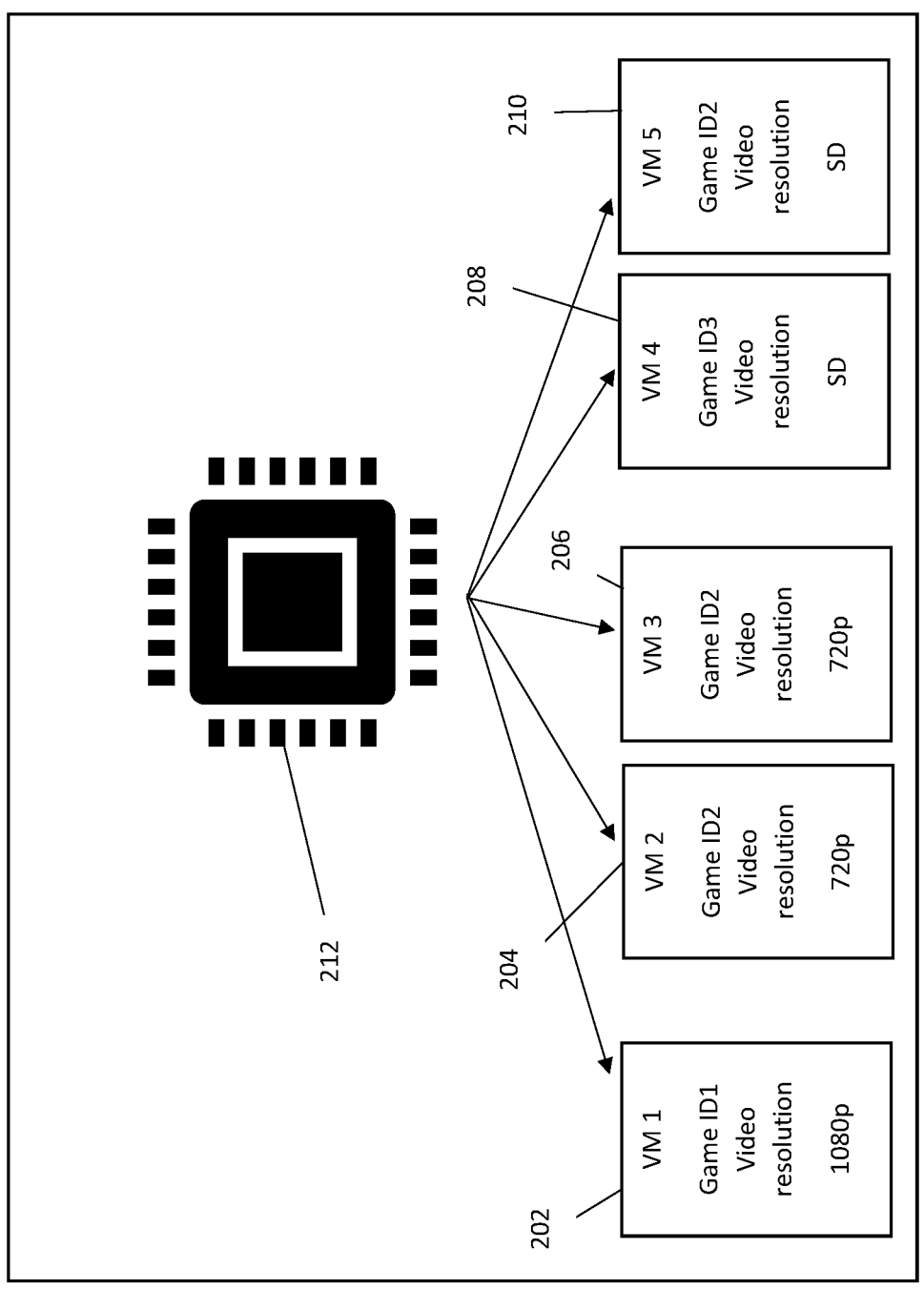
FIG. 2 is a schematic representation of a plurality of virtual machines created by the computer system of FIG. 1.

In operation and as shown exemplarily in FIG. 2, the virtualisation service 116 of the GPU server 102 can dynamically create one or more virtual machines (VMs), in this particular example five VMs, namely VM1 202, VM2 204, VM3 206, VM4 208 and VM5 210 from one GPU 212, such as GPU 114. However, a person skilled in the art will appreciate that the GPU server 102 may comprise a plurality of GPUs, each with a defined GPU capacity. In this particular example, the GPU 212 is an AMD520. The five VMs 202-210 were dynamically created when the computer system 100 received five respective gaming requests. Specifically, a first gaming request was received at the computer system 100 for the game ID1 that requires a video resolution of 1080p. In response to the request, the virtualisation service 116 of the GPU server 102 created VM1 202 that has a virtual GPU capacity to optimally implement a game of 1080p. Once VM1 202 was created, the computer system 100 determines an availability of remaining GPU resources of GPU 212. Second and third gaming requests are received at the computer system 100 for game ID2 with a video resolution of 720p. In response to receiving the gaming requests, the virtualisation service 116 creates VM2 204 and VM3 206 that substantially match the technical specification of game ID2. A fourth gaming request is received at the computer system 100 for game ID3 with a standard definition (SD) video resolution, for example, to be played on a smartphone, such as smartphone 104. The virtualisation service 116 creates VM4 208 with a virtual GPU resource that substantially matches the technical specification of Game ID3. A fifth gaming request is received at the computer system 100 for game ID2 with a video resolution of 720p. GPU 212 does not have the required GPU resource available to create a VM with matching virtual GPU resources. In this instance, the CPU 118 reformats the game to be implemented on the created VM5 210 to be played in SD only. Alternatively, the computer system 100 may select another GPU with sufficient GPU resource available or forward the gaming request to another GPU server or a public cloud server. This may be defined by a set of rules as will be further described below.

Figure 3:
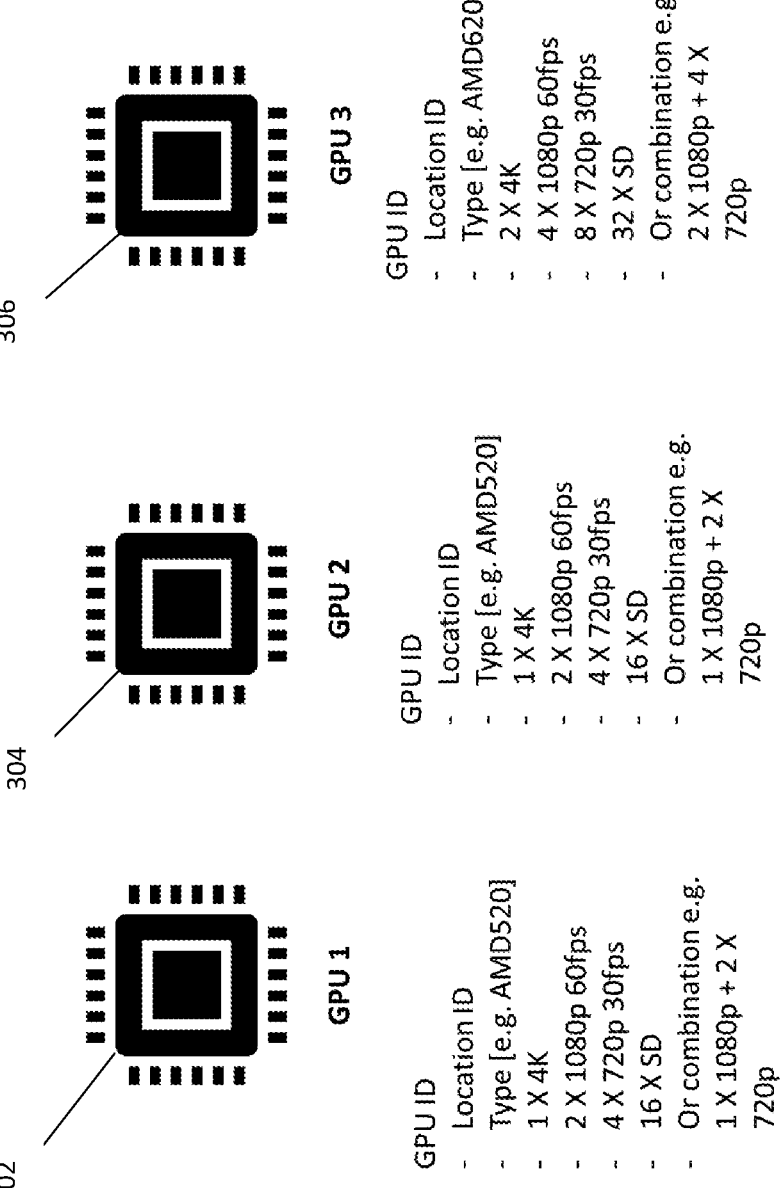
FIG. 3 shows a schematic overview of three GPUs of the computer system of FIG. 1.

In a further example, the GPU server 102 comprises three GPUS as exemplarily shown in FIG. 3. First and second GPUs 302, 304 may, for example, be realised by graphic cards of the type AMD520 and third GPU 306 may be realised by a graphic card of the type AMD620. If the GPU resources of the GPUs 302, 304, 306 are available, a possible scenario of virtual machines with associated virtual GPU resources is illustrated in the table below:

In order to match the virtual GPU resources to a game associated with a gaming request, information in relation to a plurality of games need to be obtained, including but not limited to the required and/or optimal video resolution. This may be achieved through one or more approaches that may be utilised as a stand-alone approach or in combination as described below.

The GPU resource of each virtual machine VM may typically be utilised to render the graphics of the requested game (also referred to as graphics pipeline), and encode the graphics data (also referred to as encoding pipeline). Once the graphics data has been encoded, the game can be streamed to the client computing devices 104, 106, 108 via the Internet. In some embodiments, the inventors of the present invention have found that it would be advantageous to offload the encoding pipeline from the GPU resource. For example, the GPU server 102 may comprise one or more dedicated encoding chips (not shown) that are configured to encode the graphics data of the requested game. The inventors have found that this is particularly advantageous for games that are requested by smart phones that have an operating system such as Google's Android. By utilising a dedicated encoding chip, this task can be offloaded from the GPU resource which enables the GPU server 102 to process more games compared to a GPU server 102 where the encoding pipeline is processed by the GPU resource. Whilst in this example, the GPU server comprises one or more dedicated encoding chips, it will be appreciated that the encoding pipeline may alternatively be processed by the GPU resource or the CPU 118.

Database Management Platform

In the embodiment shown in FIG. 1 of the accompanying drawings, the computer system 100 comprises a dedicated database management platform (DMP) 112 that obtains and processes information in relation to a plurality of games. A person skilled in the art will appreciate that the DMP 112 may be in the form of a stand-alone computer server or may be a networked element. In general, the DMP 112 comprises at least the common computer components, including but not limited to a CPU, a memory, an operating system and a network interface that facilitates communication with other computing devices through the network 110. A person skilled in the art will appreciate that the DMP 112 may alternatively form part of the GPU server 102 or form part of another computer server (not shown).

The DMP 112 is configured to obtain at least identification information of a game and technical information that indicate the required and/or optimal GPU resource of the game. The identification information may be in the form of a unique ID for each game, such as an identification number that is generated by the DMP 112 or a publisher of the game. The identification information may further include but is not limited to a title of the game, a genre, a recommended age group, an image, and other publisher information. The function of the identification information is to unique identify each game so that other information in relation to a

| | Capacity | | | | Used | | | | Available | | | |
|---|---|---|---|---|---|---|---|---|---|---|---|---|
| | 4k | 1080p | 720p | SD | 4k | 1080p | 720p | SD | 4k | 1080p | 720p | SD |
| GPU 1 | 1 | 2 | 4 | 8 | 0 | 0 | 2 | 1 | 0 | 0 | 1 | 8 |
| GPU 2 | 1 | 2 | 4 | 8 | 0 | 1 | 2 | 2 | 0 | 0 | 1 | 2 |
| GPU 3 | 2 | 4 | 8 | 16 | 0 | 0 | 4 | 0 | 1 | 2 | 4 | 8 |
| | | or | or | or | | | | | | or | or | or | game, such as technical or marketing information, can be collected and allocated to the correct game.

The technical information indicative of the GPU resources may include but is not limited to information indicative of an optimal and/or minimum video resolution, minimum and/or optimal frames per second, memory utilisation, CPU utilisation, network availability, and supported client computing devices. In one embodiment of the present invention, at least some of the technical information in relation to the game is obtained when the computer system 100 receives a gaming request from game providers, such as Games as a Service (GaaS), games publisher, and service provider, or game consumers directly. This can be realised through an application programming interface (API) that communicates with game providers and/or the remote computing devices 104, 106, 108. Technical information that is typically obtained through a gaming request includes game identification information, video resolution, frame rate, device type and connection type. Other possible information may include device IP and location information indicative of the location from which the gaming request was sent, such as the location of the remote computing devices 104, 106, 108.

Figure 4:
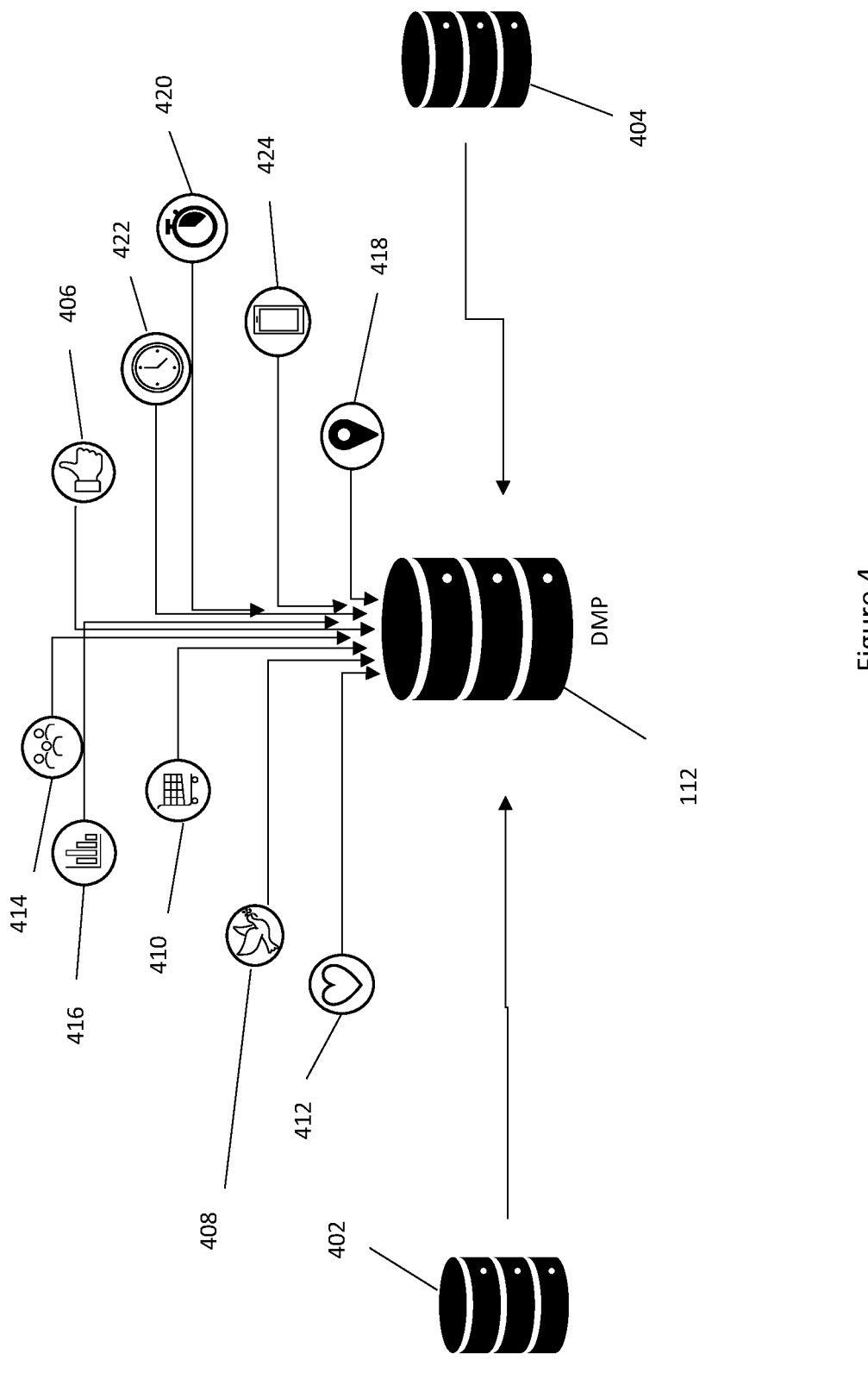
FIG. 4 is a schematic representation of the data management platform (DMP) of the computer system of FIG. 1.

The DMP 112 in this example is configured to store both structured and unstructured data in relation to the plurality of games. Referring now to FIG. 4, there is shown an illustrative example of data sources that the DMP 112 may utilise to obtain the information. Structured data may be obtained by the DMP 112 from each game request. Further structured data may be obtained directly from a Games as a Service (GaaS) platform 402, such as game identification information, genre information, supported devices of the game and technical information, such as formats and bitrates. A further source of information may be a publisher database 404 which may include information such as game identification information and keywords relating to the game.

The DMP 112 may further obtain unstructured data, such as third party information associated with a game. This additional information may be obtained from various social media platforms or esports publishing platforms, such as Facebook 406, Twitter 408, Twitch and the like. Possible additional information may include but is not limited to popularity information 410, ratings 412, esports personalities (and their followers) 414, and game usage information 416. The game usage information may be any suitable usage data, such as demographic usage data, location usage data 418, average length of play 420, average time of play 422, device type information 424, game starts and the like. The obtained information may be used by the DMP 112 to determine information indicative of a popularity of a game. This popularity information may be utilised to select a storage location for a game as will be described in further detail below.

In one particular example, the DMP 112 is configured to obtain information from digital advertising databases, including but not limited to a demand-side platform (DSP) and a supply-side platform (SSP). Information obtained by digital advertising databases may include but is not limited to location information, device type information, campaign reach, campaign frequency, impressions, date, information indicative of conversion rates, cost per acquisition, and campaign ROI. The DMP 112 may obtain the information and categorise the information based on an identified game for which a marketing campaign was run. This type of information may be stored in an unstructured way and may be used by the computer system 100 to analyse existing and future GPU resources.

In a further specific example, the DMP 112 may determine a demand score for a game. The demand score as well as the popularity of a game may be determined for a specific location and/or for specific demographics, such as age, race, ethnicity and gender. For example, the DMP 112 may use information in relation to past and present usage data of the game, and location information to determine a demand score indicative of a future demand of a game. The game may, for example, be a game that is yet to be released or a game that is only released in limited locations. In such instances, the DMP 112 may use information in relation to the game from a digital advertising database.

The DMP 112 may further use information in relation to a genre or other identification information to determine similar games to determine the demand score for a game. For example, usage data indicate that strategy games are particularly popular in females in the age group of 18-24 in Asian countries. The DMP 112 may obtain information from a game publisher that a new strategy game may be released in Asia and information obtained from a digital advertising platform indicate that the game will be well received particularly in Thailand. The DMP 112 may therefore use historical game usage data together with game likeness data and any other suitable data obtained by the DMP 112 to calculate the demand score. In one specific example, the demand score is out of a 100, e.g. 34 would be relatively low, and 87 would be relatively high.

The demand score for the new strategy game may be used to provide this information to the game publisher, a Telco and the GaaS, but may further be used to strategically plan and implement additional GPU resources in Thailand prior to the release of the game.

The demand score may be particularly valuable to game publishers and/or GaaS platforms. For example, the demand score may provide a game publisher with information indicative of where to release or promote a game and which demographics to target, such as the demand score for a new game may be relatively high for females of the age groups between 18 and 24 in Thailand, Cambodia and Brazil. A GaaS platform or Telcos, such as Telstra, may use the demand score to assist in selecting games for its service which often have a minimum guarantee's associated with the selected games. For example, the demand score indicates that games A, B and C will have highest usage rates.

Network of Computer Servers/PoPs

Figure 5:
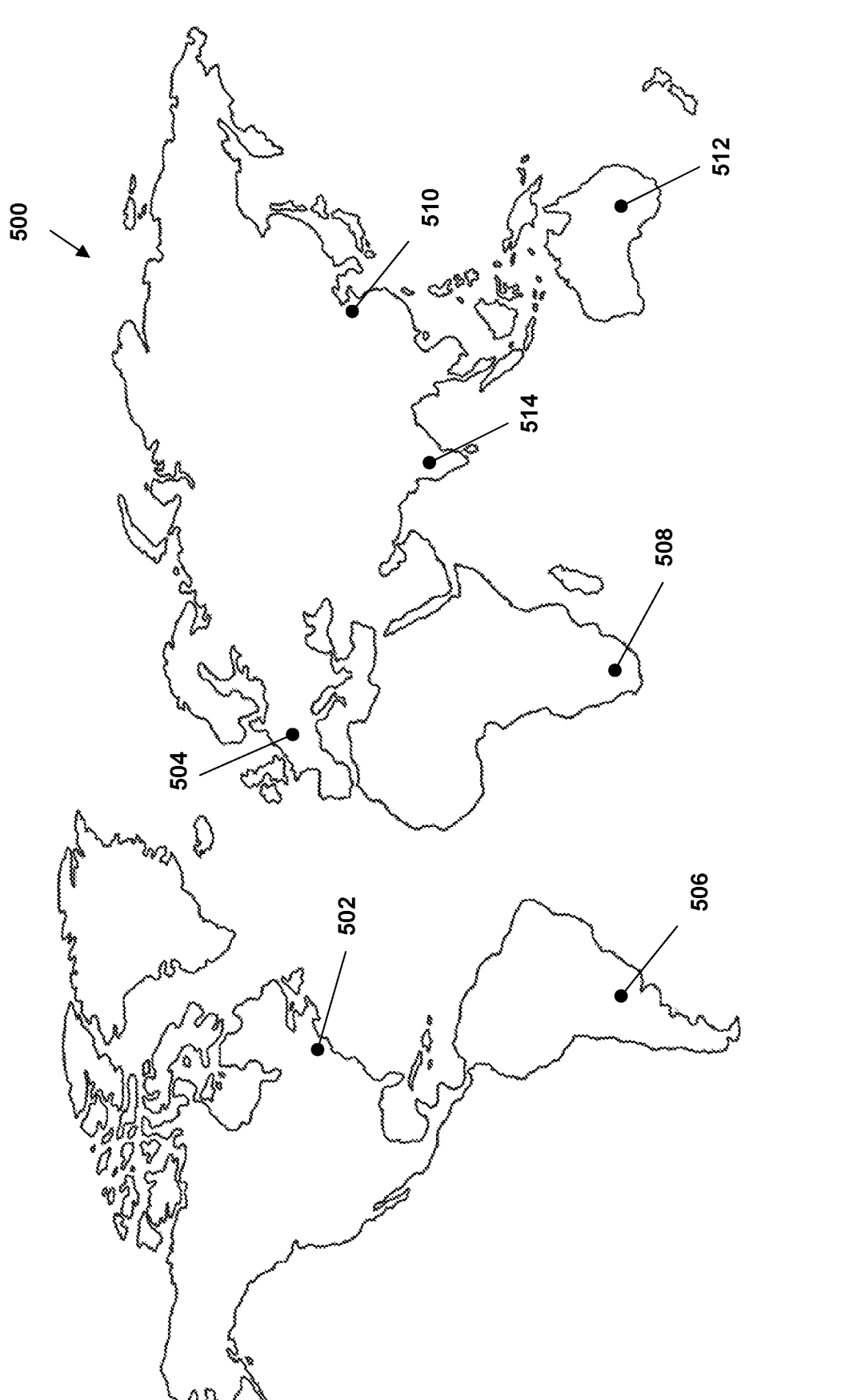
FIGS. 5 and 6 illustrate a computer system that includes computer servers in accordance with a further embodiment of the present invention.
Figure 6:
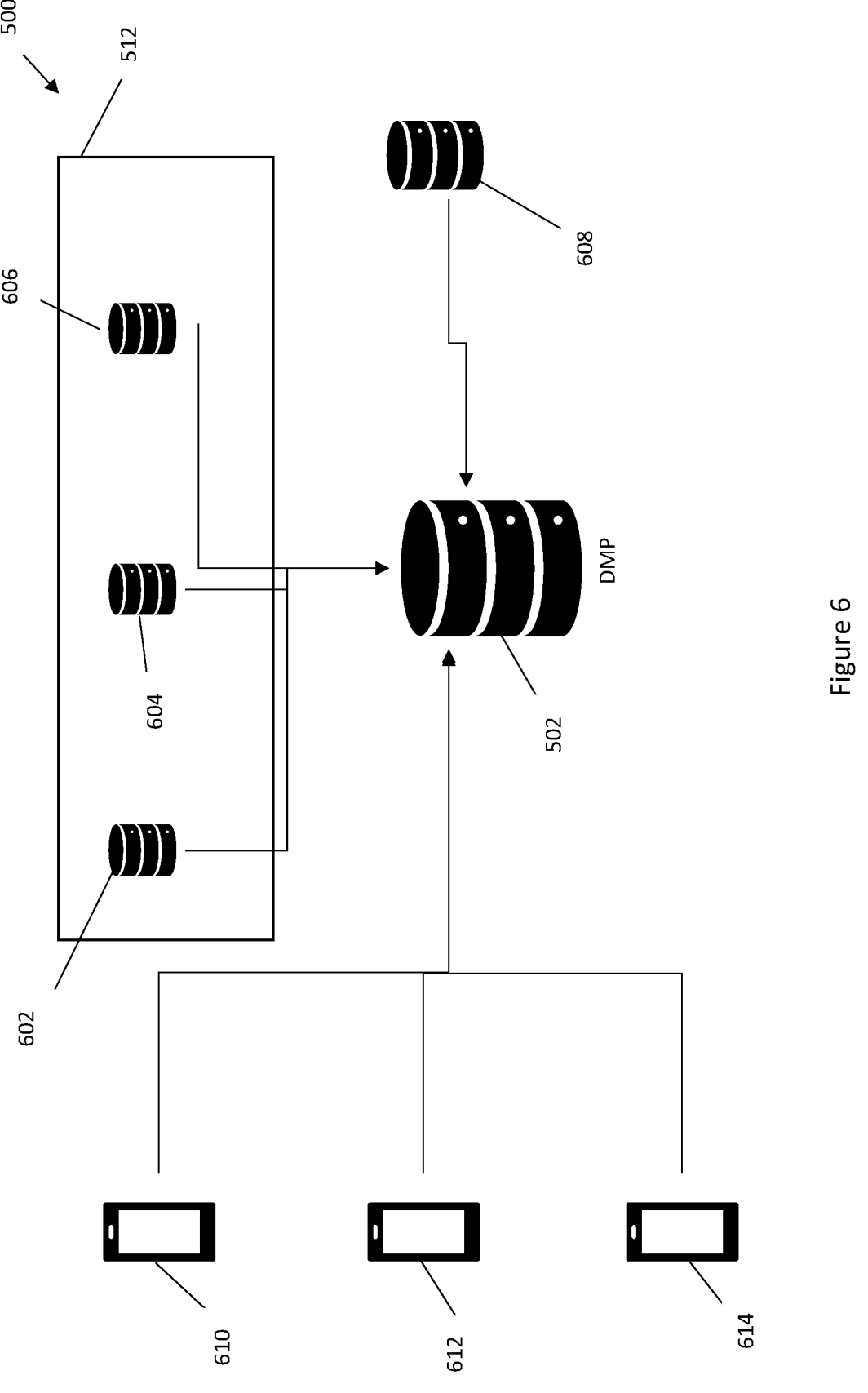

Referring now to FIGS. 5 and 6, there is shown a computer system 500 in accordance with an embodiment of the present invention. The computer system 500 comprises a plurality of points of presence (PoPs) that are connected to each other via one or more networks. In this particular example, the computer system 500 comprises six PoPs 502, 504, 506, 508, 510, 512 that each include a GPU server, such as GPU server 102. Each GPU server comprises a plurality of GPUs, each of which having a defined GPU capacity. In addition to the GPU server, each POP 502, 504, 506, 508, 510, 512 further comprises a storage array, for example, for storing games. Other PoPs illustrated in FIG. 5, such as PoP 514, do not comprise a GPU server. PoP 514 comprises a storage array for storing games. PoP 502 further comprises a data management platform, such as DMP 112 as described above.

The computer system 500 and in particular the DMP 502 obtains information of each PoP 502-514, including location information indicative of a location of the POP, maximum GPU capacity (if any), real-time GPU capacity, storage information, CPU, switch capacity and connectivity, such as type of connectivity and latency. The computer system 500 in this example is configured to store the plurality of games at selected locations. Specifically, the computer system 500 may use information in relation to usage of the games and/or other information such as popularity and demand score of each game to determine a location for storing the games. A person skilled in the art will appreciate that the usage data may further be specified by location information, such as a city, region or country, such that the top 10% games may be stored on a GPU server that is in closest proximity to that location.

For example, based on usage data, games that are played more frequently in a specific location are stored on the memory of the GPU server, such as data storage 128 of the

16

A first rule may set out that if a POP, such as PoP 512 is operating at 50% capacity, a new gaming request is assigned a virtual GPU resource that matches the technical specifications of the game, such as 720p HD or $\frac{1}{4}^{th}$ of a 520 GPU (4 vGPU). A further rule may set out that if a PoP is operating at 90% capacity, a new gaming request may be reformatted to be implemented at a lower video resolution, such as SD format taking $\frac{1}{8}^{th}$ of a 520 GPU (8 vGPU).

A specific example of these rules is provided below with reference to the GPUs illustrated in FIG. 2.

| | Capacity | | | | Used | | | | Available | | |
|---|---|---|---|---|---|---|---|---|---|---|---|
| | 4k | 1080p | 720p | SD | 4k | 1080p | 720p | SD | 4k | 1080p | 720p | SD |
| | | | | | | | | | Available [If POP 50% Capacity] | | |
| GPU 1 | 1 | 2 | 4 | 8 | 0 | 0 | 2 | 1 | 0 | 0 | 1 | 8 |
| GPU 2 | 1 | 2 | 4 | 8 | 0 | 1 | 2 | 2 | 0 | 0 | 1 | 2 |
| GPU 3 | 2 | 4 | 8 | 16 | 0 | 0 | 4 | 0 | 1 | 2 | 4 | 8 |
| | | or | or | or | | | | | | or | or | or |
| | | | | | | | | | Available [If POP 80% Capacity] | | |
| | | | | | | | | | 0 | 0 | 1 | 8 |
| | | | | | | | | | 0 | 0 | 1 | 2 |
| | | | | | | | | | 0 | 0 | 4 | 8 |
| | | | | | | | | | | or | or | or |
| | | | | | | | | | Available [If POP 90% Capacity] | | |
| | | | | | | | | | 0 | 0 | 0 | 8 |
| | | | | | | | | | 0 | 0 | 0 | 2 |
| | | | | | | | | | 0 | 0 | 0 | 8 |
| | | | | | | | | | | or | or | or |

GPU server 102 of POP 512. Specifically, if the plurality of games amounts to 500 games, a top 10% of the most frequently played games in Australia may be stored on the data storage 128 of the GPU server 102 of POP 512. The remaining 450 games may be stored on a storage array of POP 512 and rarely used games may be stored in regional storage that is remote from a GPU server, such as PoP 514. By selectively storing the games on different storage arrays depending on usage and/or popularity, the computer system 500 provides the advantage that the average start time of the most popular games will be significantly reduced relative to other games. In this way, the start time of the most popular games can be optimised. For example, a game may be implemented within 10 seconds from data storage 128 of the GPU server 102, whereas a game may be implemented within 1 minute from a storage array of the same PoP.

Set of Rules

Referring now in particular to FIG. 6, there is shown components of the computer system 500. In particular, the computer system 500 comprises the DMP 502, POP 512 including a GPU server 102 with three GPUs 602, 604, 606. FIG. 6 further illustrates a public cloud server 608, and client computing devices 610, 612, 614 which in this example are illustrated as smartphones. However, a person skilled in the art will appreciate that any communications-enabled computing devices are envisaged.

The step of creating one or more virtual machines (VMs) on the GPU server 102 and implementing the requested game on the VM is conducted in accordance with a set of rules. Exemplary rules will be described in the following. However, a person skilled in the art will appreciate that these examples are not exhaustive and that any suitable rules may be established to optimise the implementation of games in a virtualisation environment.

Another rule may include use of latency data to select a location for creating the virtual machine and implementing the requested game. For example, if GPU 602 has no available GPU resources and GPUs 604, 606 have a latency above a predetermined threshold, the computer system 500 may send a new gaming request to a remote GPU server (not shown) or to public cloud server 608. In this regard, the computer system 500 and in particular the DMP 502 may obtain and use information indicative of a latency, information indicative of failover capability, costs to select a computer server for creating the VM and implementing the game.

Demand Report

Specific embodiments of the present invention relate to a computer implemented method and computer system for optimising GPU resources for gaming in a virtualisation environment. With reference to the computer-implemented method, the method comprises an initial step of obtaining information in relation to a plurality of games as in part already described above. Specifically, the information includes at least the identification information that unique identifies each game, the technical information indicative of the required GPU resource of each game and usage data of each game. The usage data may be indicative of historical and/or present usage data of each game implemented in a virtualisation environment.

The method further comprises providing a plurality of GPU servers, where each GPU server comprises at least one graphics processing unit (GPU) with a predefined GPU capacity, a central processing unit (CPU), a memory and a network interface for facilitating communication with computing devices through a network. As such, the method can obtain information on the existing GPU capacity which may be specified by the location of each GPU server, for example, by city, region, state of country.

Through the network, a plurality of gaming requests are received wherein each gaming request is a request to play a game in a virtualisation environment. The game request comprises at least identification information that uniquely identified the requested game and location information relating to the request, for example, at which computer server the request was received. In some examples, the plurality of game requests are being recorded over a period of time to form the above-mentioned usage data.

The information is then used to determine a GPU resource requirement relative to the predefined GPU capacity for an identified location, where location may relate to a city, a region, a state or even a country. For example, the determined GPU resource requirement may be used to analyse the utilisation of the existing GPUs of the GPU servers. The information may assist in the planning and implementing of additional GPU resources, and maintaining and changing existing GPU resources. Furthermore, the GPU resource requirement may be used to analyse a future demand of GPU resources for an identified location. This embodiment has the particular advantage that the strategic acquisition and implementation of additional GPU resources can be optimised.

In a specific example, the method may combine additional information derived from marketing campaigns for a game as described above with the predefined GPU capacity for an identified location with the demand score to determine information indicative of a number of gaming requests for the identified location. The information indicative of the future demand of GPU resources may include any further suitable information. For example, the information may be specified by location, client computing device types, connection types and associated data on resolution types.

The information will facilitate to create an optimised capacity planning of future GPU resources and additional GPU capacity for existing POPs based on game types, device trends, data trends [e.g. 4G to 5G transition], marketing and future game popularity predictions.

Method

Referring now to FIG. 7 of the accompanying drawings, there is shown a flow chart 700 illustrating a computer implemented method of gaming in a virtualisation environment in accordance with an embodiment of the present invention.

In a first step 702, information in relation to a plurality of games is obtained. The games are typically games that are configured to be played in a virtualisation environment. The information includes at least identification information that uniquely identifies each game and technical information indicative of the required and/or optimal GPU resource of each game. Identification information may be in any suitable form such as a system generated identifier or a title of the game. The technical information may comprise a required and/or optimal video resolution of each game and the required and/or optimal frame rate per second. This information is needed to determine a virtual GPU capacity that is needed to successfully implement a game in the virtualisation environment. The method 700 further comprises a step of providing 704 a GPU server comprising at least one graphics processing unit (GPU) with a predefined GPU capacity, a central processing unit (CPU), a memory and a network interface for facilitating communication with remote computing devices through a network. In practice, the step 704 typically comprises providing a plurality of GPU servers, each having one or more graphics processing units realised by suitable graphic cards. Each GPU server may be part of a point of presence (POP) that may or may not have additional storage capacity.

In a further step 706, the method 700 comprises receiving, through the network from a remote computing device, a gaming request to play one of the plurality of games in a virtualisation environment. In practice, the step 706 comprises receiving a plurality of gaming requests that may be received at the same or multiple different computer servers. The remote computing device may, for example, be a smart phone or any other communications-enabled computing device. The gaming requests are typically received directly from a user, but may also be received from a games publisher, GaaS or other gaming providers.

The method 700 further comprises a step of identifying 708 the requested game and using 710 the information in relation to the game to dynamically create a virtual machine on the GPU server. The virtual machine is assigned a virtual GPU capacity from the at least one GPU that matches the required GPU resource for the game. In a further step 712, the requested game may be implemented on the created virtual machine.

The method may further comprise a step of determining a substantially real-time GPU capacity on the GPU server. The real-time GPU capacity can then be used to create more virtual machines for other game implementations.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method of gaming in a virtualisation environment, the method comprising:

obtaining information in relation to a plurality of games, the information including at least identification information that uniquely identifies each game and technical information indicative of the required GPU resource of each game;

providing a GPU server comprising at least one graphics processing unit (GPU) with a predefined GPU capacity, a central processing unit (CPU), a memory and a network interface for facilitating communication with computing devices through a network;

receiving, through the network, from a computing device a gaming request to play one of the plurality of games in a virtualisation environment;

identifying the requested game and using the information in relation to the identified game to dynamically create a virtual machine on the GPU server, the virtual machine being assigned a virtual GPU capacity from the at least one GPU that substantially matches the required GPU resource for the game; and implementing the requested game on the virtual machine.

2. The method of claim 1, wherein the technical information in relation to the game includes one or more of: information indicative of optimal video resolution, minimum frames per second, memory utilisation, CPU utilisation, network availability, and supported client computing devices, and at least some of the information in relation to the game is obtained through the gaming request.

3. The method of claim 1, wherein the step of dynamically creating one or more virtual machines comprises the step of dynamically dividing the GPU capacity of a GPU on the GPU server into one or more units of virtual GPUs.

4. The method of claim 1, comprising determining a capacity of available GPU resources on the GPU server for additional game requests in the virtualisation environment, wherein the method is conducted such that a plurality of GPUs are provided on the GPU server by using the information on the determined capacity of available GPU resources and the information in relation to a game associated with a game request to select one of the plurality of GPUs to create the virtual machine on the selected GPU.

5. The method of claim 1, comprising determining a latency for the GPU server.

6. The method of any one of claim 4, comprising a step of using the information on the determined capacity of available GPU resources and the information in relation to a game associated with a game request to re-format the game to be implemented on a virtual machine.

7. The method of claim 1, comprising obtaining information in relation to the gaming request, wherein the information includes one or more of: a client device IP, location information of the client device, a publisher of the game, a service provider (such as Telcos), information in relation to gaming as a service (GaaS), a location information of a computing device.

8. The method of claim 1, comprising obtaining additional information in relation to the game, and using the additional information to determine a popularity in relation to the plurality of games, wherein the additional information includes one or more of:

historical and/or current usage data;
popularity information;
rating;
information derived from marketing campaigns (such as location information, reach, frequency, total impressions, dates, conversion rates, cost per acquisition, campaign ROI);
information derived from social media; and
information derived from esports publishing platforms.

9. The method of claim 8, comprising a step of using the additional information to determine a demand score indicative of a future demand of a game, wherein the popularity and/or demand score is determined by location.

10. The method of claim 1, comprising providing a plurality of computer servers that are connected to each other and the GPU server via the network, wherein each computer server is associated with GPU capacity, CPU and storage information.

11. The method of claim 10, comprising a step of determining a latency for each computer server and GPU server, and using the determined latency to route a gaming request to a selected computer server.

12. The method of claim 10, wherein each computer server comprises a memory for storing games, and wherein the method comprises a step of selectively storing the plurality of games on one or more of the plurality of computer servers by using the usage data and/or popularity in relation to the plurality of games to select a computer server and/or GPU server for storing selected games on the respective memories.

13. The method of claim 1, wherein if it is determined that the capacity of available GPU resources at the GPU server falls below a predefined threshold, the method includes a step of facilitating to implement the game on a further computer server, and/or reformatting a game associated with a gaming request to be implemented with a lower GPU resource.

14. A computer system for gaming in a virtualisation environment, the computer system comprising:

at least one graphics processing unit (GPU) with a predefined GPU capacity;
a central processing unit (CPU);
a network interface for communicating with computing devices via a network;
a virtualisation service to establish a virtualisation environment comprising a plurality of virtual machines, each virtual machine comprising a graphics driver to communicate with the at least one GPU;
a memory having a plurality of instructions stored therein that, when executed by the CPU, causes the computer system to:
obtaining information in relation to a plurality of games, the information including at least identification information that uniquely identifies each game and technical information indicative of the required GPU resource of each game;
receiving, through the network from a remote computing device, a gaming request to play one of the plurality of games in a virtualisation environment;
identifying the requested game and using the information in relation to the game to dynamically create a virtual machine, the virtual machine being assigned a virtual GPU capacity from the at least one GPU that matches the required GPU resource for the game; and
implementing the requested game on the virtual machine.

15. The computer system of claim 14, comprising a plurality of computer servers that are communicatively connected to each other and the GPU server through the network.

16. A computer-implemented method of gaming in a virtualisation environment, the method comprising:

obtaining information in relation to a plurality of games, the information including at least:
identification information that uniquely identifies each game;
technical information indicative of the required GPU resource of each game;
usage data indicating historical and/or present usage of each game in a virtualisation environment;
providing a plurality of GPU servers, each GPU server comprising at least one graphics processing unit (GPU) with a predefined GPU capacity, a central processing unit (CPU), a memory and a network interface for facilitating communication with computing devices through a network;
receiving, through the network from a computing device, a plurality of gaming requests, each gaming request being to play one of the plurality of games in a virtualisation environment, and comprising at least identification information uniquely identifying the requested game and location information relating to the request; and
using the obtained information in relation to the plurality of games and the location information to determine a GPU resource requirement relative to the predefined GPU capacity for an identified location.

17. The method of claim 16, wherein the GPU resource requirement relative to the predefined GPU capacity is determined to analyse a utilisation of the GPUs of the plurality of GPU servers and/or to analyse a future demand of GPU resources for an identified location.

18. The method of claim 16, comprising obtaining additional information in relation to the game to determine a popularity in relation to the plurality of games, wherein the additional information includes one or more of the following:

popularity information;

rating;

information derived from marketing campaigns (such as location information, reach, frequency, total impressions, dates, conversion rates);

information derived from social media; and information derived from esports publishing platforms.

19. The method of claim 18, comprising a step of using the identification information and/or the additional information to characterise a game in a plurality of categories and using the characterisation to determine a demand score indicative of a number of gaming requests for the game.

20. A computer system for gaming in a virtualisation environment, the computer system comprising:

at least one graphics processing unit (GPU) with a predefined GPU capacity;

a central processing unit (CPU);

a network interface for communicating with computing devices via a network;

a virtualisation service to establish a virtualisation environment comprising a plurality of virtual machines, each virtual machine comprising a graphics driver to communicate with the at least one GPU;

a memory having a plurality of instructions stored therein that, when executed by the CPU, causes the computer system to:

obtaining information in relation to a plurality of games, the information including at least identification information that uniquely identifies each game;

technical information indicative of the required GPU resource of each game;

usage data indicating historical and/or present usage of each game;

receiving, through the network from a computing device, a plurality of gaming requests, each gaming request being to play one of the plurality of games in a virtualisation environment, and comprising at least identification information uniquely identifying the requested game and location information relating to the request;

using the obtained information in relation to the plurality of games and the location information to determine a GPU resource requirement relative to the predefined GPU capacity for an identified location.

* * * * *